(12) United States Patent
Wolters

(10) Patent No.: US 6,554,701 B1
(45) Date of Patent: Apr. 29, 2003

(54) FOLDABLE OSCILLATING CHAFF PAN FOR AN AGRICULTURAL COMBINE

(75) Inventor: Joshua J. Wolters, Geneseo, IL (US)

(73) Assignee: Case Corporation, Racine, WI (US)

(*) Notice: Subject to any disclaimer, the term of this patent is extended or adjusted under 35 U.S.C. 154(b) by 28 days.

(21) Appl. No.: 09/996,539

(22) Filed: Nov. 28, 2001

(51) Int. Cl.[7] ............................................... A01F 12/44
(52) U.S. Cl. .................................... 460/101; 460/111
(58) Field of Search .................... 460/97, 145, 147, 460/101, 102, 95, 103

(56) References Cited

U.S. PATENT DOCUMENTS

| | | | |
|---|---|---|---|
| 2,314,901 A | 3/1943 | Scranton | 130/27 |
| 2,441,917 A | * 5/1948 | Dion | |
| 2,626,159 A | 1/1953 | Thompson | 275/3 |
| 3,670,739 A | 6/1972 | Rowland-Hill | 130/27 T |
| 3,673,779 A | 7/1972 | Scarnato et al. | 56/503 |
| 4,056,107 A | 11/1977 | Todd et al. | 130/27 R |
| 4,557,276 A | 12/1985 | Hyman et al. | 130/27 |
| 4,614,197 A | 9/1986 | Weber et al. | 130/27 R |
| 4,669,489 A | 6/1987 | Scraeder et al. | 130/27 R |
| 4,897,071 A | 1/1990 | Desnijder et al. | 460/10 |
| 5,324,231 A | 6/1994 | Van Herpe et al. | 460/106 |
| 5,791,986 A | 8/1998 | Underwood et al. | 460/101 |
| 5,878,557 A | 3/1999 | Wyffels et al. | 56/13.5 |
| 6,251,009 B1 | 6/2001 | Grywacheski et al. | 460/112 |

* cited by examiner

Primary Examiner—Thomas B. Will
Assistant Examiner—Meredith Petravick
(74) Attorney, Agent, or Firm—John William Stader; A. Nicholas Trausch; Rebecca L. Henkel

(57) ABSTRACT

A foldable chaff pan for attachment to an oscillating element of a cleaning apparatus or system of an agricultural combine for oscillation therewith for conveying chaff from the oscillating element to a non-oscillating chopper or spreader mounted to a fixed frame of the combine. The chaff pan is also sidewardly tiltable with the cleaning apparatus or system, if so capable.

13 Claims, 9 Drawing Sheets

FOLDABLE OSCILLATING CHAFF PAN FOR AN AGRICULTURAL COMBINE

TECHNICAL FIELD

This invention relates generally to agricultural combines, and more particularly, to a foldable chaff pan for disposition rearwardly of cleaning apparatus of an agricultural combine for conveying chaff from the cleaning apparatus to a chopper and/or spreader, the pan being connected to the cleaning apparatus for oscillation therewith and being foldable between a deployed position for conveying the chaff, and a retracted position for allowing access to the cleaning apparatus and the chopper and spreader for ease of maintenance, service and inspection thereof.

BACKGROUND ART

Currently, combines typically include a straw chopper and/or straw spreader for disposing of straw separated from the harvested crop onto the crop field. In addition, some combines have a chaff spreader for spreading the chaff separated from the grain by the cleaning apparatus or system. It is desirable to provide the chaff spreading function, however, it is also desired to eliminate the additional chaff spreader apparatus due to the cost, weight, space, and maintenance requirements thereof. One approach for eliminating the chaff spreader is to route the chaff blown and discharged by the cleaning apparatus into the straw chopper and/or straw spreader so as to be chopped and/or spread over the field thereby. This can be done by mounting the chopper and/or spreader directly behind the chaff discharge end of the cleaning apparatus. However, a shortcoming of this location is that it makes access to the cleaning apparatus for service, maintenance, and inspection difficult, which is undesirable. As an alternative, the chopper and/or spreader can be spaced rearwardly of the cleaning apparatus to provide an access space or gap therebetween for service and the like. However, this space or gap presents a problem as it must be crossed or bridged by the chaff enroute to the chopper and/or spreader. The chaff is typically carried rearwardly by a flow of air blown upwardly through the cleaning apparatus, and to enclose this space to contain the chaff containing air flow and direct it to the chopper and/or spreader, a pan or other enclosure can be used. It is known to mount such pans to the frame or other enclosures of the combine, or to the cleaning apparatus itself, and for the pan or enclosure to be foldable between an operational position and an open position. However, pans or enclosures attached to the combine frame but not to the cleaning apparatus have the disadvantage that they do not provide a continuous path from the cleaning apparatus to the chopper and/or spreader and do not vibrate or oscillate with the cleaning apparatus. Pans attached to the cleaning apparatus will oscillate therewith, but if supported only by the cleaning apparatus place loads thereon which can degrade the operation thereof. Thus, what is sought is a pan for conveying chaff to a chopper and/or spreader located spacedly behind the cleaning apparatus of a combine, that is attachable to the cleaning apparatus for vibration or oscillation therewith, but without unduly loading it, and which is easily and conveniently repositionable or movable for allowing access to the cleaning apparatus and the chopper and/or spreader.

Additionally, some combines have cleaning apparatus which are self-leveling, that is, they pivot or tilt at least sidewardly to compensate for tilting of the combine as it moves across the sides of hills and the like. Thus, it is also sought that a pan for bridging the space between the cleaning apparatus and the chopper and/or spreader be able to pivot or tilt with the cleaning apparatus.

SUMMARY OF THE INVENTION

What is disclosed is a foldable chaff pan for attachment to an oscillating or vibrating element of a cleaning apparatus or system of an agricultural combine for oscillation therewith for conveying chaff from the oscillating element to a non-oscillating chopper or spreader mounted to a fixed frame of the combine, which chaff pan overcomes many of the shortcomings discussed above, including avoiding loading of the cleaning apparatus or system so as not to degrade the operation thereof, and which is sidewardly tiltable with the cleaning apparatus or system, if so capable. The foldable chaff pan has a surface for receiving the chaff positionable in a first position adjacent to the oscillating element of the cleaning apparatus which can be, for instance, a chaffer, a sieve, a frame or rails supporting the same, or the like, for receiving the chaff therefrom, a pivoting element for connecting the pan to the oscillating element for oscillation therewith and pivotal movement relative thereto about a generally horizontal axis between the first position and a second position angularly related to and beneath the first position, and a linkage arrangement for connecting the pan to the fixed frame such that the pan is largely supported by the fixed frame, the linkage arrangement including a shaker arm connected to the pan and locatable in a support position for supporting the pan in the first position while allowing the pan to oscillate with the oscillating element relative to the linkage arrangement, and the linkage arrangement including a releasable spring element holding the shaker arm in the support position and releasable to allow the shaker arm to move from the support position to another position to allow the pan to be folded to the second position to allow easier access to the cleaning apparatus.

The shaker arm of the foldable chaff preferably includes a pivotal connection to the pan and a pivotal connection to another element of the linkage arrangement connected to the spring element for applying a force of the spring against the shaker arm for holding the pan in the first position. Additionally, according to one aspect of the invention, the spring element is positionable in a first orientation for exerting a force through the shaker arm against the pan for holding the pan in the first position, and is positionable in a second orientation for exerting a force through the shaker arm against the pan for holding the pan in the second position.

When the cleaning apparatus is mounted for pivotal movement relative to the frame in a sidewardly direction relative to a direction of oscillation, the shaker arm of the pan can be optionally connected to the pan with an element which allows sideward movement of the pan relative thereto such that the pan can pivot sidewardly with the cleaning apparatus relative to the linkage arrangement.

DETAILED DESCRIPTION OF THE INVENTION

Figure 1:
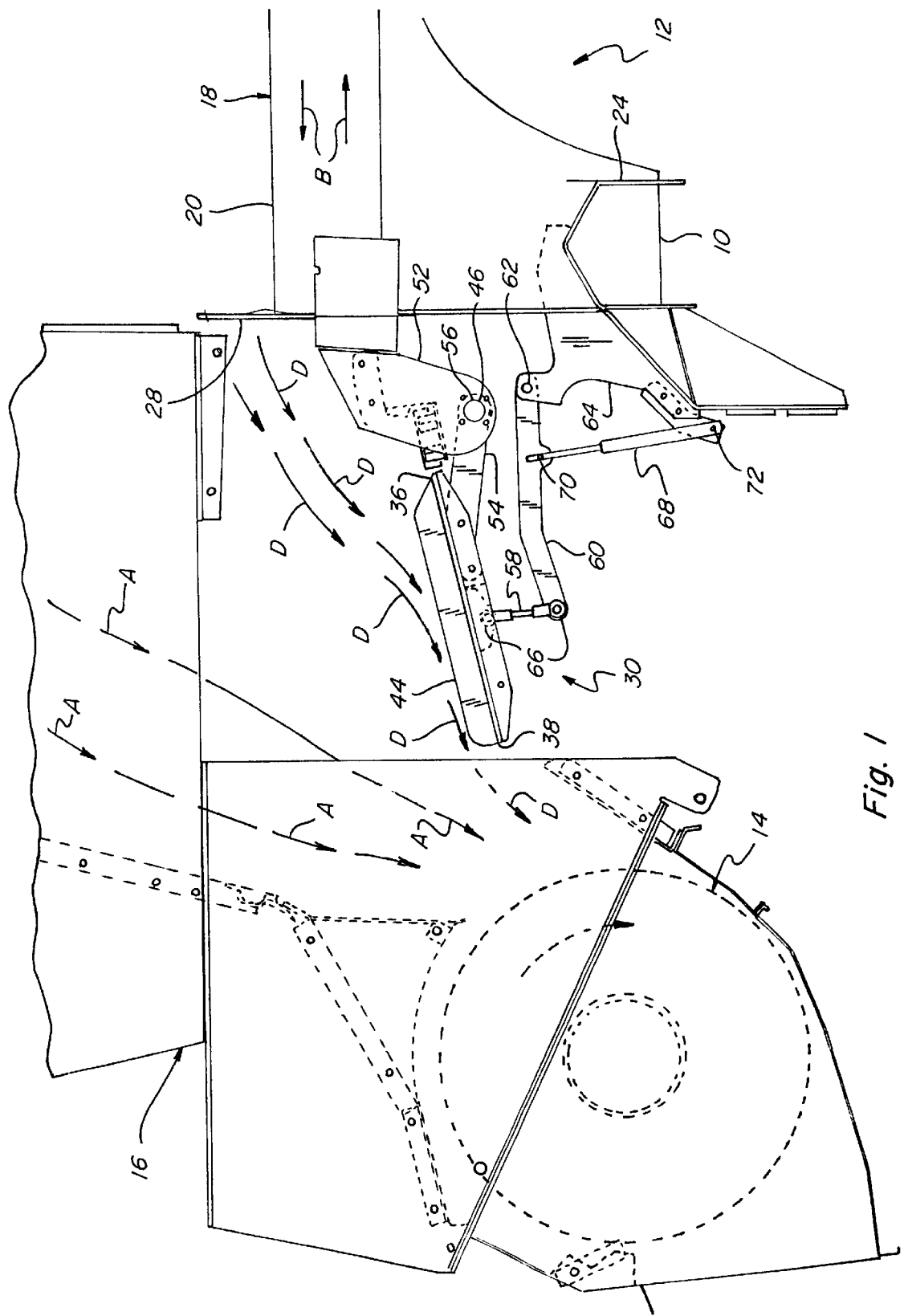
FIG. 1 is a simplified, fragmentary side elevational view of an agricultural combine including a foldable oscillating chaff pan according to the present invention, the chaff pan being shown in a first or deployed position for directing an outflow of chaff from a cleaning apparatus or system of the combine into a straw chopper and/or spreader of the combine.

Referring now to the drawings, wherein preferred embodiments of the present invention are shown, in FIG. 1, a rear end 10 of a self-propelled agricultural combine 12 is shown, including a rearwardly located rotary device 14 representative of commonly used devices for chopping and/or spreading straw, stalks, and other crop residue and trash that has been separated from the grain of the crops by a threshing mechanism (not shown) of combine 12 located forwardly of rear end 10. The straw, stalks and the like is propelled rearwardly, as denoted by arrows A, by rotating beaters or the like from the threshing mechanism through an exhaust duct 16 to rotary device 14 for chopping and/or spreading thereby. After separation from the straw, stalks, and other residue and trash, the grain is then separated from chaff by cleaning apparatus 18 including at least one generally horizontal chaffer or sieve (not shown) supported on front-to-rear extending chaffer rails 20 and 22 (FIG. 2) located on opposite sides of the chaffer or sieve, the chaffer or sieve including apertures therethrough adjustable in size for allowing passage of grains of a selected maximum size therethrough, while preventing the larger chaff from passing therethrough, for separating the grain from the chaff in the well known manner. Cleaning apparatus 18 is oscillated in one or more generally horizontal directions, as denoted by arrows B, by oscillating apparatus (not shown) to facilitate the separation of the grain from the chaff, also in the well known conventional manner.

Figure 2:
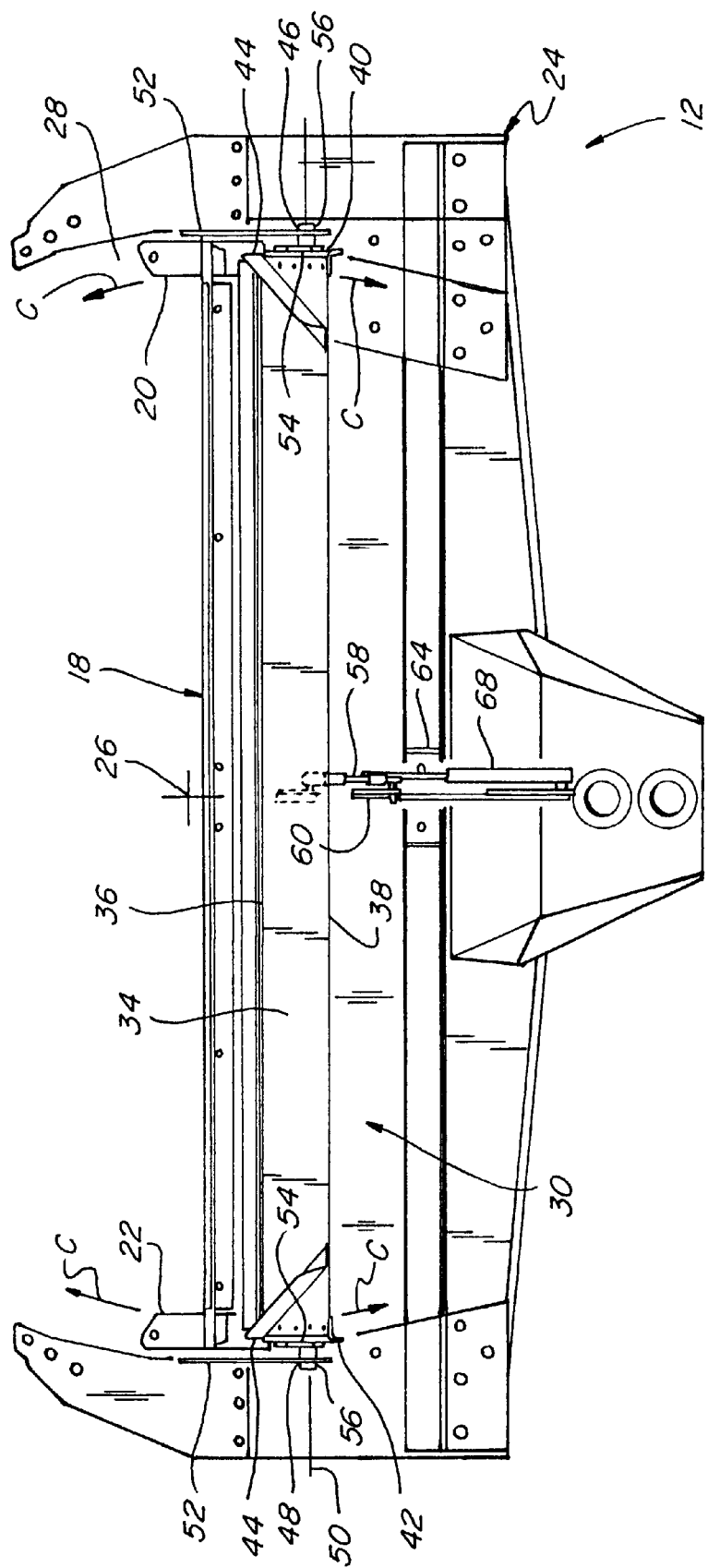
FIG. 2 is a simplified rear elevational view of the cleaning system or apparatus of the combine of FIG. 1 and the foldable oscillating chaff pan in the deployed position.

Referring also to FIG. 2, cleaning apparatus 18 of combine 12 can be supported for pivotal movement by a combine frame 24 about a front to rear pivotal axis, such as pivotal axis 26 shown, as denoted by arrows C, such that cleaning apparatus 18, including the chaffer or sieves, can be oriented substantially horizontally while combine frame 24 is tilted at an angle to horizontal, for instance as combine 12 is moving along a hillside or the like. After separation from the grain, the chaff is discharged and carried from cleaning apparatus 18 by a flow of air, denoted by arrows D (FIG. 1) through a rearwardly facing exhaust opening 28. In the past, the chaff discharged through exhaust opening 28 would have been deposited on the ground behind combine 12, in a swath or residue path corresponding approximately to the width of opening 28. In the present instance, instead of being deposited on the ground, the flow of air containing the chaff is directed into rotary device 14 for chopping and/or spreading thereby, by a chaff pan 30 constructed and operable according to the teachings of the present invention.

Figure 3:
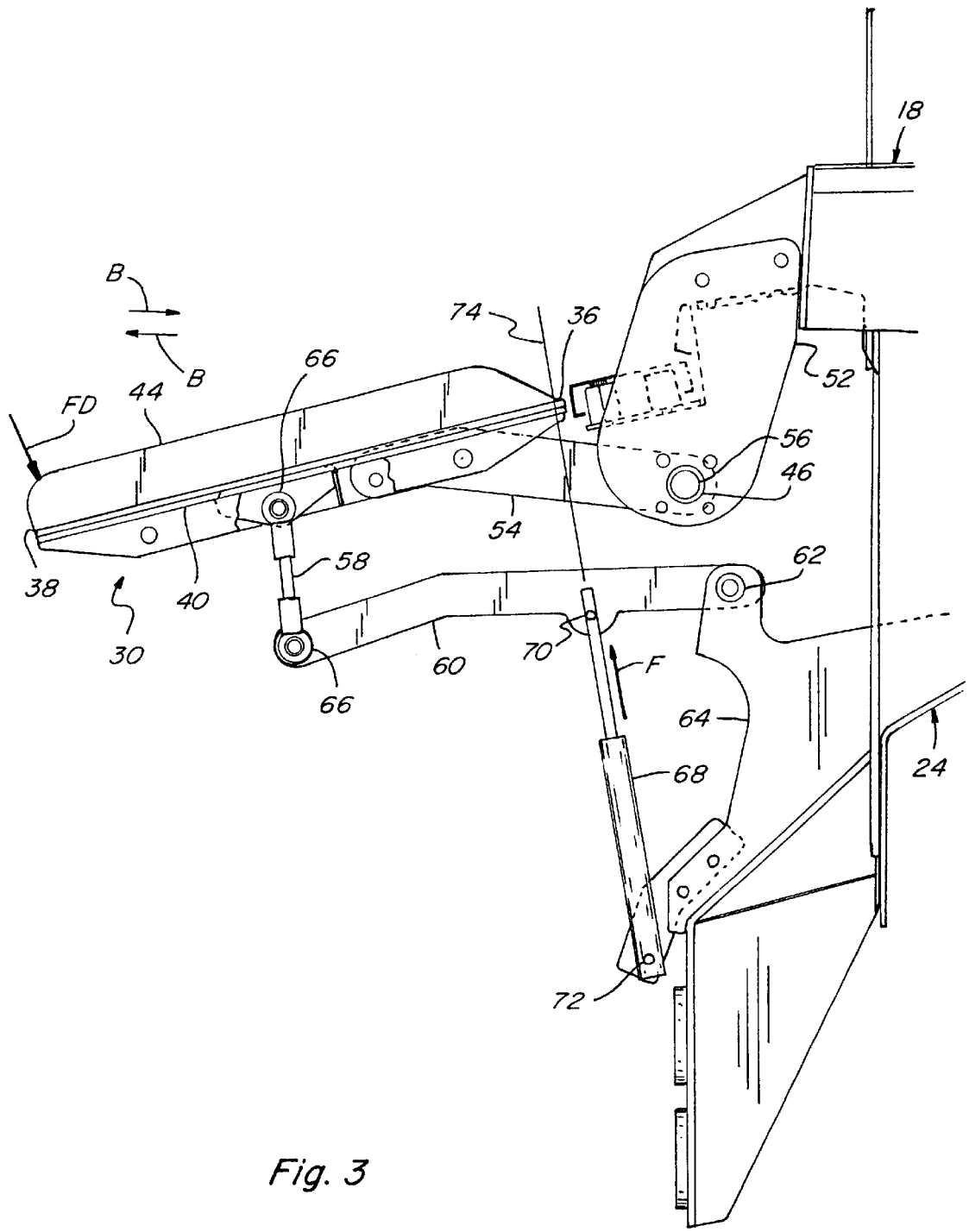
FIG. 3 is an enlarged side elevational view of the rear end of the cleaning system and the foldable oscillating chaff pan of FIG. 1, showing additional details of the chaff pan.
Figure 4:
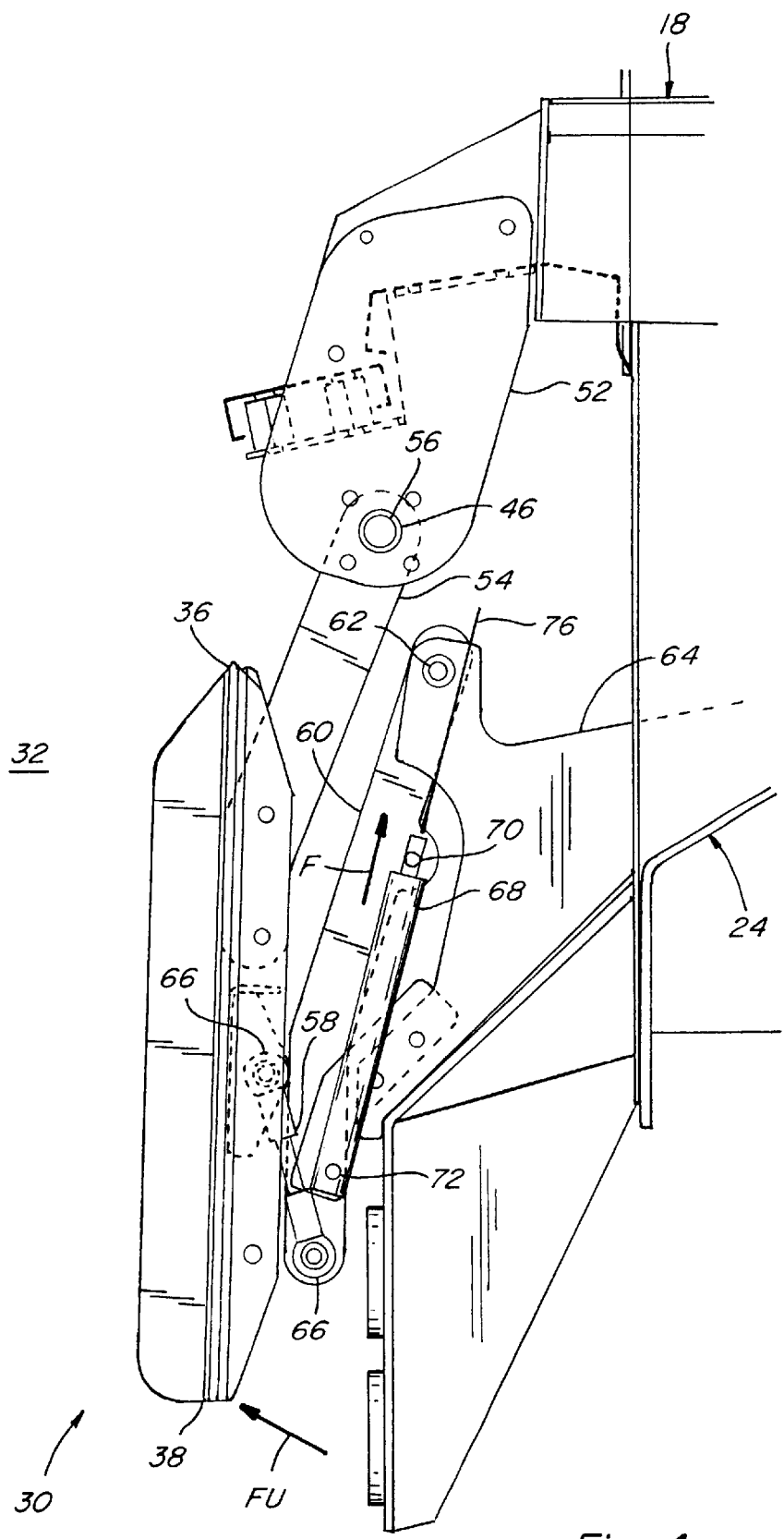
FIG. 4 is an enlarged side elevational view of the cleaning apparatus and foldable oscillating chaff pan of FIG. 1, showing the chaff pan folded to a second or retracted position.

Referring also to FIGS. 3 and 4, chaff pan 30 is attached or mounted to chaff rails 20 and 22 of cleaning apparatus 18 so as to oscillate therewith and is foldable between a first or deployed position (FIGS. 1, 2, and 3) preferably oriented at a small acute angle to horizontal so as to extend downwardly and rearwardly for conveying the chaff to rotary device 14, and a second or folded position (FIG. 4) angularly related to and generally beneath the first position to provide a gap or space 32 rearwardly of folded pan 30. Space 32 is sufficiently large for a person to stand in while inspecting or accessing cleaning apparatus 18 through opening 28 for maintenance, repair, and/or cleaning. Space 32 also provides better and easier access to rotary device 14. Chaff pan 30 includes a generally planar pan surface 34 having a front edge 36, an opposite rear edge 38, and sides 40 and 42 extending between front and rear edges 36 and 38, each side 40, 42 including an upwardly extending angled chaff guide 44 for directing chaff moving along surface 34, as denoted by arrows D, into device 14.

Chaff pan 30 is pivotally connected to chaffer rails 20, 22 of cleaning apparatus 18 by a pair of pivot joints 46 and 48 for oscillation therewith and pivotal movement relative thereto about a generally horizontal axis 50 (FIG. 2) between the first or deployed position, and the second or folded position. Pivot joints 46, 48 each include an L shape bracket 52 fixedly connected to the chaffer rail 20 or 22, an arm 54 fixedly connected to side 40 or 42 of pan 30, and a pin 56 pivotally connecting bracket 52 and arm 54. To support pan 30 in the first or deployed position while at the same time allowing pan 30 the freedom to oscillate with chaffer rails 20, 22, a shaker arm 58 is pivotally connected at one end thereof to a central portion of pan 30 and at an opposite end to a free end of a lever arm 60 having an opposite end pivotally connected to frame 24 by a lever arm pivot 62 located on a lever arm bracket 64 fixedly mounted to frame 24.

Figure 5:
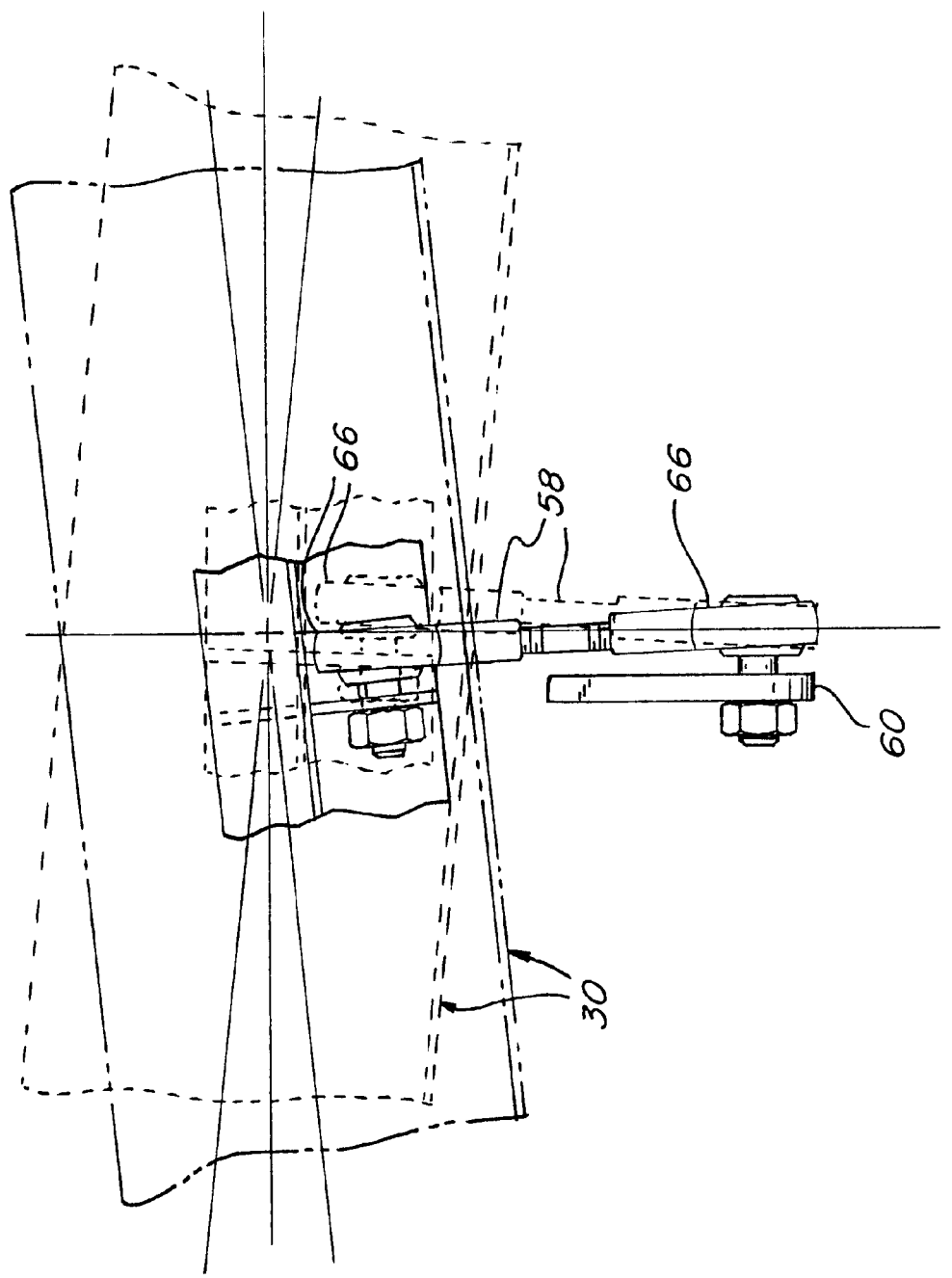
FIG. 5 is a simplified fragmentary rear elevational view of the chaff pan of FIG. 1, shown in alternative tilted orientations to illustrate an approximate range of possible motion of the pan when tilted with the cleaning apparatus or system (not shown)

Referring also to FIG. 5, in the present embodiment, because cleaning apparatus 18 can be pivoted sidewardly about axis 26 as denoted by arrows C (FIG. 2) as well as oscillated frontwardly and rearwardly as denoted by arrows B (FIGS. 1 and 3), it is desired that pan 30 be pivotable with the cleaning apparatus so as to be movable in both of those directions relative to lever arm 60 at least while being supported in the first or deployed position. To accommodate this, shaker arm 58 is located at about the middle of pan 30 with respect to the side-to-side direction, generally even with axis 26 (FIG. 2) and preferably includes spherical or ball rod end bearings or pivot joints 66 on the opposite ends thereof pivotally connecting arm 58 to pan 30 and lever arm 60.

A resilient biasing element, preferably a conventional compressible gas spring 68, is pivotally connected at a pivot 70 to lever arm 60 and at a pivot 72 to lever arm pivot bracket 64 on frame 24 in a position for exerting an upwardly directed force F along an imaginary line 74 against lever arm 60 (FIG. 3) for resiliently urging lever arm 60 upwardly against shaker arm 58 for holding shaker arm 58 in the position for supporting pan 30 in the first position shown. Line 74 extends upwardly from lever arm pivot 62 and is located on the rearward side of lever arm pivot 62. Gas spring 68 is compressible by exerting a downward force thereagainst such as through pan 30, as denoted by arrow FD (FIG. 3), such that lever arm 60 will be caused to pivot downwardly about lever arm pivot 62 and pan 30 will pivot in the same direction about pivot joints 46 to the second position, as shown in FIG. 4. As force FD is applied to compress gas spring 68, pan 30 is pivoted toward the second position and gas spring 68 is compressed and pivoted about pivot 72 so as to now exert its force on the front side of lever arm pivot 62 along an imaginary line 76 (FIG. 4) for holding pan 30 in the second or folded position shown. Space 32 is now accessible for service or inspection purposes, as desired. Because pan 30 is pivotally connected to lever arm 60 by shaker arm 58, pan 30 will be allowed to oscillate and pivot about axis 26 when in the first or the second positions, in this latter regard, this allowing operation of cleaning apparatus 18 with pan 30 in the second position, if desired. With pan 30 in the second position as shown in FIG. 4, a generally upward and rearward force FU can be applied to pan 30 where shown or elsewhere to pivot gas spring 68 about pivot 72 so as to be reoriented to now exert its force upwardly on the rear side of lever arm pivot 62 and extend, so as to pivot lever arm 60 about lever arm pivot 62 to pivot pan 30 upwardly about joints 46 to the first position, as shown in FIGS. 1–3.

The magnitude of force F exerted by gas spring 68, and the distance from the application of force F against lever arm 60 (at pivot 70) to lever arm pivot 62 relative to the distance from the applied force FD and force FU to lever arm pivot 62, will determine the required magnitude of forces FD and FU, it being desired that the magnitude of such forces be sufficiently low that a person could fold and deploy pan 30 with relative ease.

Figure 6:
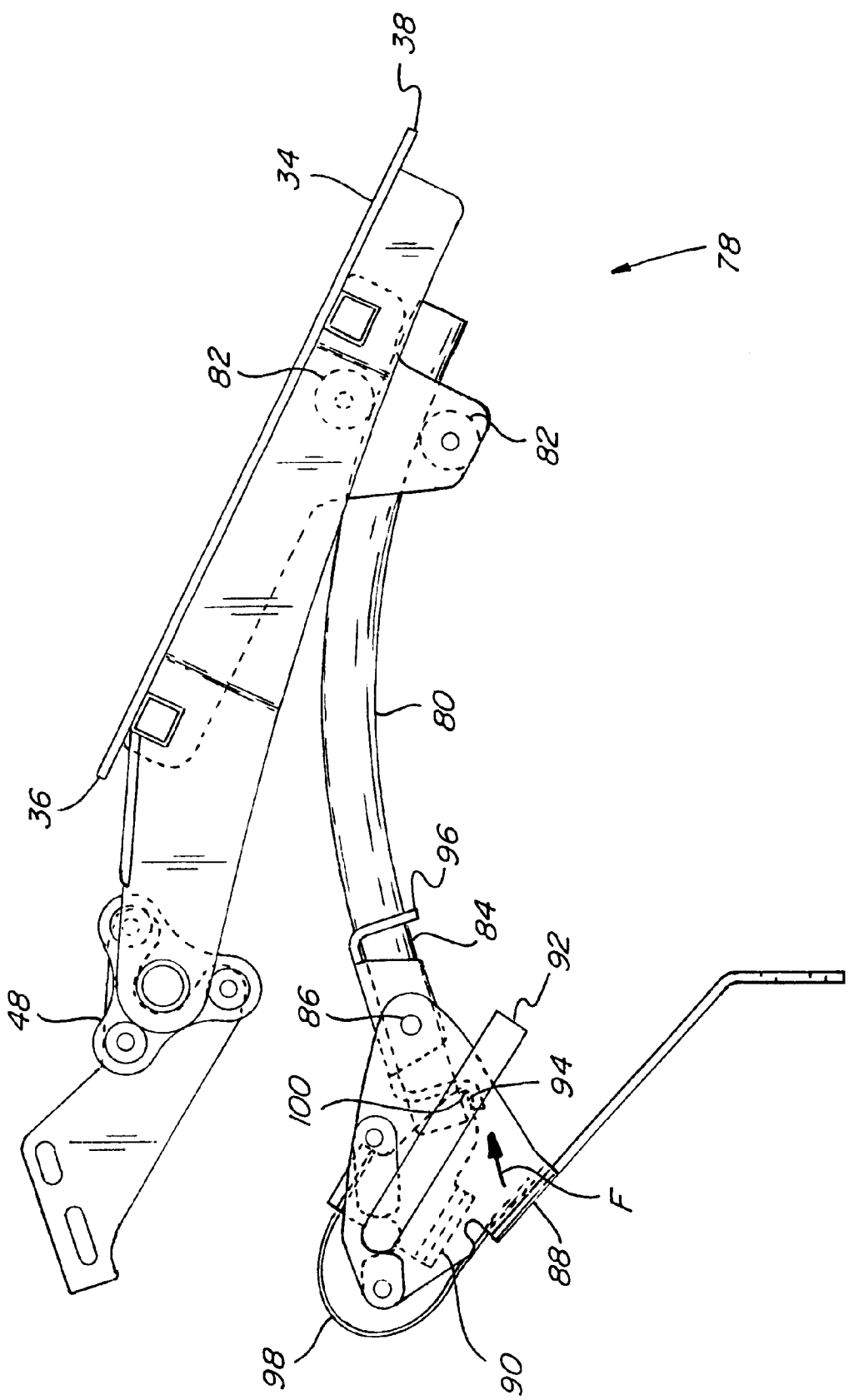
FIG. 6 is a fragmentary side elevational view of another foldable oscillating chaff pan according to the present invention, the chaff pan being shown in a first or deployed position for directing an outflow of chaff from a cleaning apparatus or system of a combine into a straw chopper and/or spreader of the combine (not shown)
Figure 7:
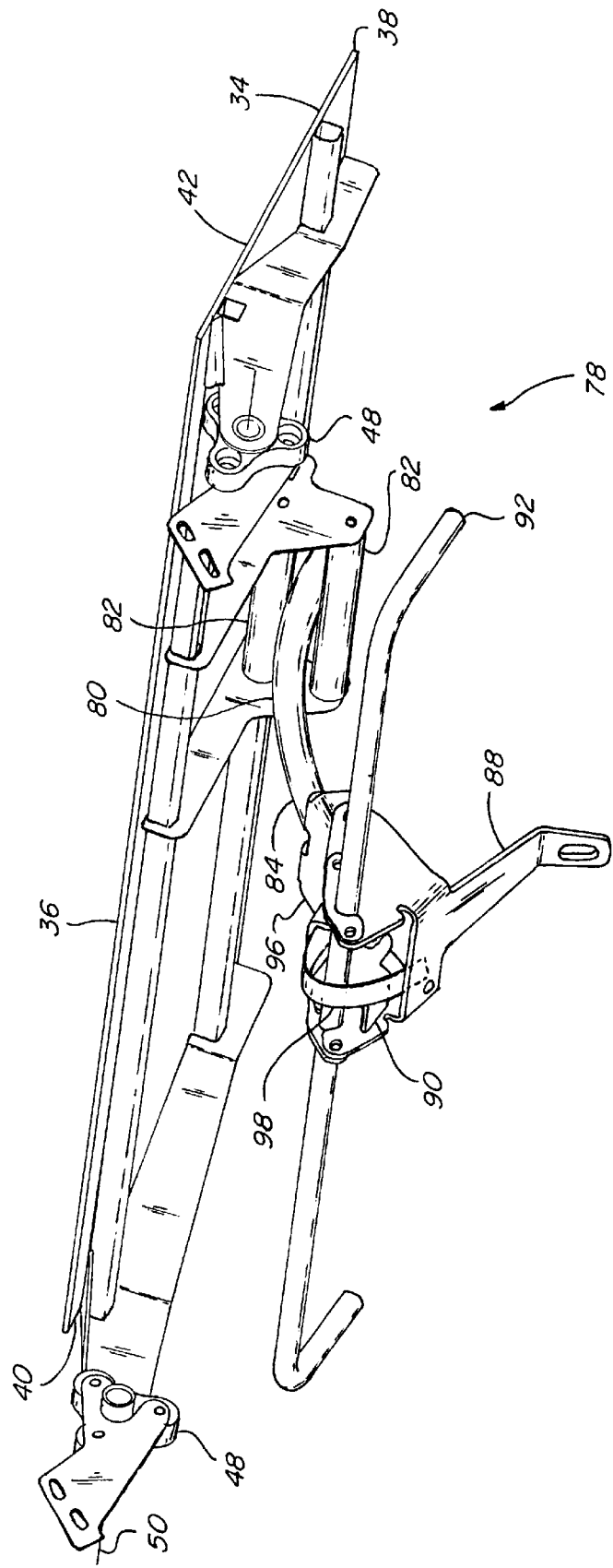
FIG. 7 is a perspective view of the chaff pan of FIG. 6.
Figure 8:
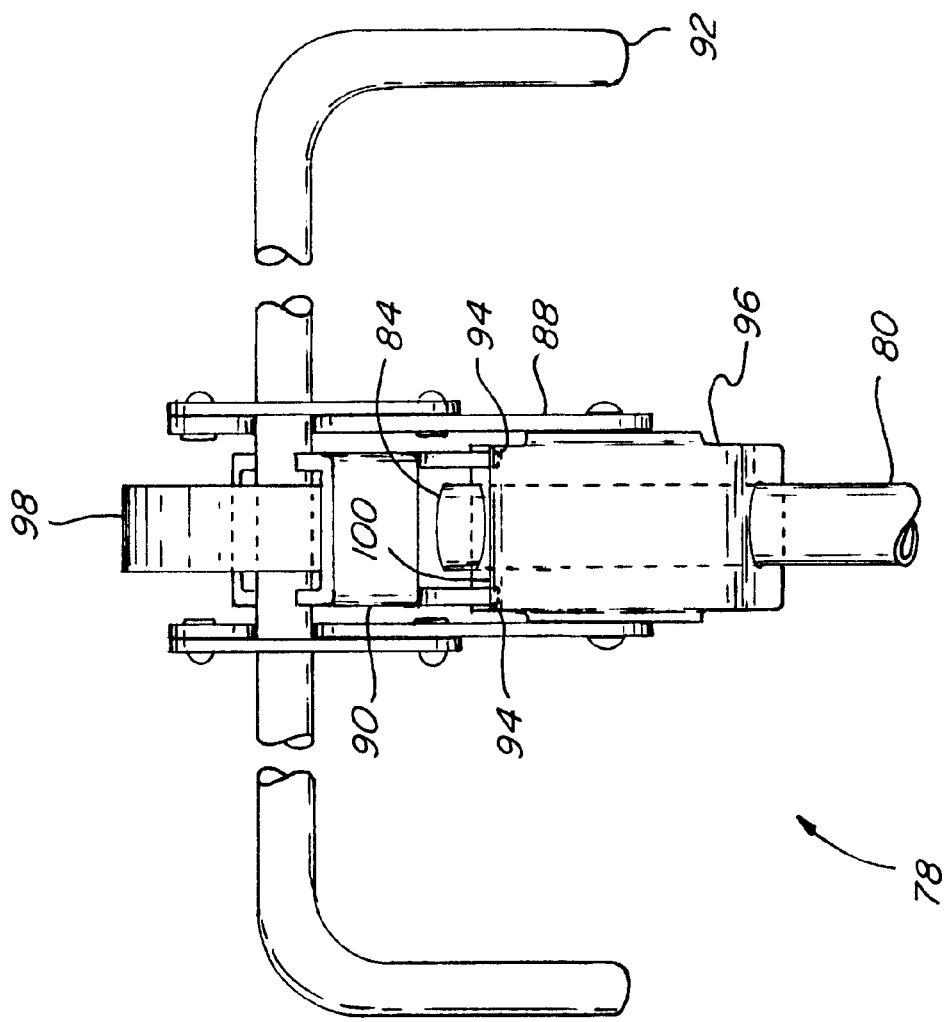
FIG. 8 is a fragmentary top view of the a shaker arm, lever arm, shaker arm bracket, and spring of the pan of FIG. 6, showing cooperative engagement of a free end of the lever arm with the shaker arm bracket.
Figure 9:
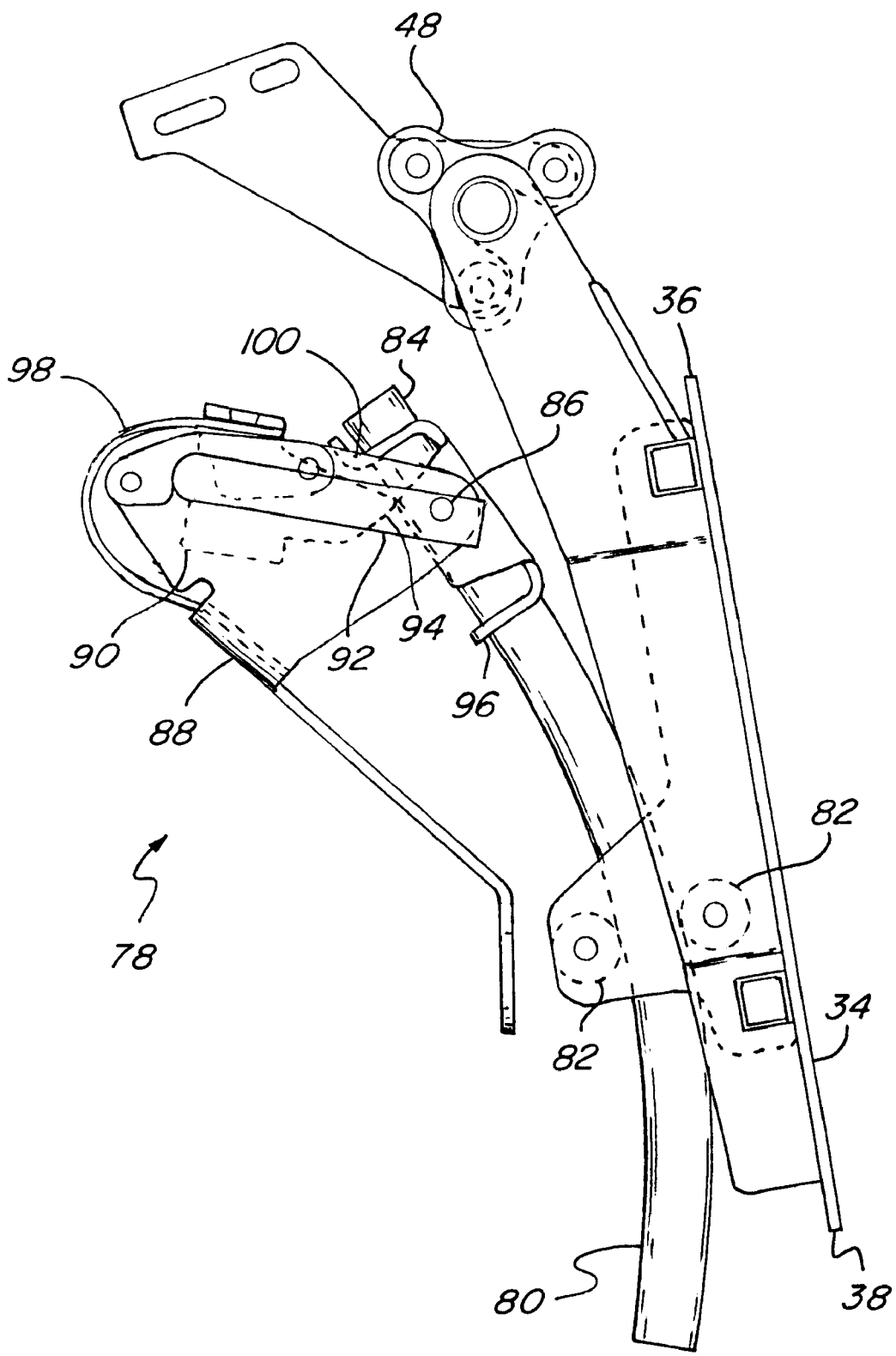
FIG. 9 is an enlarged side elevational view of the foldable oscillating chaff pan of FIG. 6, showing the pan in a second or folded position.

Turning to FIGS. 6, 7, 8, and 9, an alternative chaff pan 78 constructed and operable according to the teachings of the present invention is shown, like parts of chaff pan 78 and chaff pan 30 discussed above being identified by like numbers. Chaff pan 78, like chaff pan 30, is pivotally mountable to aspects of a cleaning apparatus or system of a combine, such as, but not limited to, those aspects shown in FIGS. 1–4 discussed above, for oscillation therewith and for conveying chaff from the cleaning apparatus or system to a chopper and/or spreader located in spaced relation therebehind. Chaff pan 78 is also foldable between a first or deployed position oriented as shown in FIGS. 6 and 7 for conveying the chaff to the chopper and/or spreader, and a folded position as shown in FIG. 9, to provide a gap or space between chaff pan 78 and the more rearwardly located chopper and/or spreader for allowing access to the cleaning apparatus or system for desired purposes. Chaff pan 78 includes a generally planar pan surface 34 having a front edge 36, an opposite rear edge 38, and sides 40 and 42 extending therebetween for conveying the chaff from the cleaning apparatus to the chopper and/or spreader, essentially in the same manner as described above with regard to chaff pan 30.

Chaff pan 78 can be pivotally connected to chaffer rails 20, 22 of cleaning apparatus 18 (not shown) in essentially the same manner as chaff pan 30 by a pair of pivot joints 46 and 48 for oscillation with rails 20, 22 and pivotal movement relative thereto about a generally horizontal axis 50 (FIG. 7) between the first or deployed position, and the second or folded position. To support pan 78 in the first or deployed position while at the same time allowing pan 78 the freedom to oscillate with chaffer rails 20, 22, a centrally located elongate, curved shaker arm 80 is received between a pair of spaced rollers 82 mounted to chaff pan 78 beneath pan surface 34 so as to allow rolling or sliding relative movement between the pan and shaker arm 80, and also pivotal movement both in a side-to-side direction, and a front-to-rear direction. Shaker arm 80 has a proximal end 84 pivotally connected at pivot 86 to a lever arm pivot bracket 88 which fixedly mounts to the frame of the combine, such as frame 24 (not shown), similarly as shown by lower arm pivot bracket 64 of the previous embodiment 30. A lever arm 90 is also pivotally mounted to bracket 88 for pivotal movement with an elongate, double ended handle 92 extending outwardly from either side of bracket 88. Lever arm 90 includes a pair of spaced free ends 94 located on opposite sides of proximal end 84 of shaker arm 80 and cooperatively receivable respectively in indentations or receptacles 100 of a shaker arm bracket 96. Bracket 96 is mounted to and pivotable with shaker arm 80 about pivot 86. The cooperative receipt of free ends 100 of lever arm 90 in receptacles 100 holds shaker arm 80 oriented approximately as shown in FIGS. 6 and 7 for holding chaff pan 78 in the first or deployed position approximately as shown. Referring in particular to FIG. 6, lever arm 90 is maintainable in the position shown with free ends 94 cooperatively received in receptacles 100 by a resilient biasing element, preferably a conventional flat steel spring 98 bent in an arc and extending between bracket 88 and lever arm 90, for exerting a desired spring force against lever arm 90, as denoted at F. Lever arm 90 can be released from shaker arm bracket 96 by manually rotating handle 92 downwardly from the position shown, to disengage free ends 94 of lever arm 90 from receptacles 100 of shaker arm bracket 96, to thereby allow shaker arm 80 to pivot downwardly about pivot 86 and roll or slide downwardly between rollers 82 such that the pan will pivot downwardly about pivot joints 46 and 48 to the second or folded position, as shown in FIG. 9. Then, when handle 92 is released, spring 98 will return lever arm 90 to the rotational position where free ends 94 is positioned for engaging bracket 96, as also shown in FIG. 9. To pivot the pan back to the first or deployed position from the second or folded position, handle 92 is rotated upwardly such that free ends 94 of lever arm 90 can again be cooperatively received in receptacles 100 of bracket 96 as shown in FIGS. 6 and 7 for holding the pan in the first position.

Here, it should be understood that, although in the first embodiment 30 a gas spring is used and in the second embodiment 78 a steel spring is used, other biasing members such as other kinds of springs and the like can be used as appropriate. For instance, in embodiment 78 a gas spring could be used as the biasing member, as desired.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A foldable chaff pan for attachment to an oscillating element of cleaning apparatus of an agricultural combine for oscillation therewith for conveying chaff from the oscillating element to a non-oscillating chopper or spreader mounted to a fixed frame of the combine, comprising:

a pan having a surface for receiving the chaff positionable in a first position adjacent to the oscillating element of the cleaning apparatus for receiving the chaff therefrom;

a pivoting element for connecting the pan to the oscillating element for oscillation therewith and pivotal movement relative thereto about a generally horizontal axis between the first position and a second position angularly related to and beneath the first position; and a linkage arrangement for connecting the pan to the fixed frame for supporting the pan in the first position, the linkage arrangement including a shaker arm connected to the pan and locatable in a support position for supporting the pan in the first position while allowing the pan to oscillate with the oscillating element relative to the linkage arrangement, and the linkage arrangement including a releasable spring element for holding the shaker arm in the support position and releasable to allow the shaker arm to move from the support position to another position to allow the pan to be folded to the second position.

2. The foldable chaff pan of claim 1, wherein the shaker arm includes a pivotal connection to the pan and a pivotal connection to another element of the linkage arrangement connected to the spring element for applying a force of the spring against the shaker arm for holding the pan in the first position.

3. The foldable chaff pan of claim 1, wherein the spring element is positionable in a first orientation for exerting a force through the shaker arm against the pan for holding the pan in the first position, and positionable in a second orientation for exerting a force through the shaker arm against the pan for holding the pan in the second position.

4. The foldable chaff pan of claim 1, wherein the cleaning apparatus is mounted for pivotal movement relative to the frame in a sideward direction relative to a direction of oscillation, and the shaker arm is connected to the pan with an element which allows sideward movement of the pan relative thereto such that the pan can pivot sidewardly with the cleaning apparatus relative to the linkage arrangement.

5. A foldable chaff pan connected to cleaning apparatus mounted for oscillating movement relative to a frame of an agricultural combine for receiving chaff from the cleaning apparatus, the foldable chaff pan comprising:

a pivot joint connecting the pan to the cleaning apparatus for oscillating movement with the cleaning apparatus, the pivot joint allowing pivotal movement of the pan relative to the cleaning apparatus about a generally horizontal pivotal axis;

a shaker arm connected to the pan for supporting the pan in a first pivotal position relative to the cleaning apparatus for receiving the chaff therefrom;

a lever arm pivotally mounted to the frame at a lever arm pivot and having a free end engageable with the shaker arm for holding the shaker arm in a position for supporting the pan in the first pivotal position; and a biasing element connected between the frame and the lever arm and in a position for releasably holding the lever arm in a position in engagement with the shaker arm for holding the shaker arm in the position for supporting the pan in the first pivotal position.

6. The foldable chaff pan of claim 5, wherein the biasing element comprises a variable length compression spring having a first end pivotally connected to the lever arm and a second end pivotally connected to the frame, wherein when the pan is in the first pivotal position the compression spring will be oriented to exert a force upwardly along a first line on one side of the lever arm pivot against the lever arm and through the lever arm and the shaker arm to the pan for holding the pan in the first pivotal position, and wherein an external downward force can be applied to compress the variable length compression spring so as to pivot the lever arm about the lever arm pivot to allow the pan to be pivoted to a second pivotal position angularly oriented to and below the first pivotal position and reorient the compression spring so as to exert a force upwardly along a second line on an opposite side of the lever arm pivot for holding the pan in the second pivotal position.

7. The foldable chaff pan of claim 5 wherein the cleaning apparatus is mounted to the combine frame for side-to-side pivotal movement and the shaker arm is connected to the pan to allow the pan to pivot in the side-to-side direction with the cleaning apparatus relative to the frame.

8. The foldable chaff pan of claim 5 wherein the shaker arm is elongate and is connected to the pan by rollers which can roll longitudinally along the shaker arm to allow the pan to oscillate with the cleaning apparatus relative to the shaker arm.

9. The foldable chaff pan of claim 5, wherein the lever arm includes a handle movable for pivoting the lever arm about the lever arm pivot to disengage from the shaker arm to allow the shaker arm and the pan to pivot about the pivotal axis to a second pivotal position angularly related to and below the first pivotal position.

10. The foldable chaff pan of claim 5, wherein the biasing element comprises a steel spring disposed between the lever arm and the frame.

11. A foldable chaff pan for attachment to an oscillating element of cleaning apparatus of an agricultural combine for oscillation therewith for conveying chaff from the oscillating element to a non-oscillating chopper or spreader mounted to a fixed frame of the combine, comprising:

a pan having a surface for receiving the chaff positionable in a first position adjacent to the oscillating element of the cleaning apparatus for receiving the chaff therefrom;

a pivoting element for connecting the pan to the oscillating element for oscillation therewith and pivotal movement relative thereto about a generally horizontal axis between the first position and a second position angularly related to and beneath the first position; and a linkage arrangement for connecting the pan to the fixed frame for supporting the pan in the first position, the linkage arrangement including a shaker arm having a first end connected to the pan and an opposite second end, the shaker arm being locatable in a support position for supporting the pan in the first position while allowing the pan to oscillate with the oscillating element relative to the shaker arm, a lever arm pivotally connected by a lever arm pivot to the fixed frame and releasably engageable with the second end of the shaker arm for supporting the shaker arm in the support position, and a biasing member disposed between the fixed frame and the lever arm biasing the lever arm into engagement with the shaker arm for supporting the pan in the first position.

12. The foldable chaff pan of claim 11, wherein the biasing member is a steel spring.

13. The foldable chaff pan of claim 11, further comprising a member connected to the lever arm and movable for disengaging the lever arm from the shaker arm to allow the pan to be pivoted to a second position angularly related to the first position.

* * * * *